(12) United States Patent
Wang et al.

(10) Patent No.: US 11,225,411 B2
(45) Date of Patent: Jan. 18, 2022

(54) CONTINUOUS PROCESS FOR PRODUCING INSOLUBLE SULFUR

(71) Applicant: China University of Petroleum (East China), Qingdao (CN)

(72) Inventors: Yanzhen Wang, Qingdao (CN); Chunmin Song, Qingdao (CN); Hongling Duan, Qingdao (CN); An Zhang, Qingdao (CN); Li Gao, Qingdao (CN)

(73) Assignee: China University of Petroleum (East China), Qingdao (CN)

( * ) Notice: Subject to any disclaimer, the term of this patent is extended or adjusted under 35 U.S.C. 154(b) by 0 days.

(21) Appl. No.: 16/990,422

(22) Filed: Aug. 11, 2020

(65) Prior Publication Data
US 2021/0198108 A1  Jul. 1, 2021

(30) Foreign Application Priority Data

Aug. 12, 2019 (CN) .......................... 201910739537.2

(51) Int. Cl.
*C01B 17/02* (2006.01)
*C01B 17/12* (2006.01)

(52) U.S. Cl.
CPC .......... *C01B 17/12* (2013.01); *C01B 17/0232* (2013.01); *C01B 17/0237* (2013.01); *C01B 17/0248* (2013.01); *C01B 17/0253* (2013.01); *C01P 2004/60* (2013.01); *C01P 2006/80* (2013.01)

(58) Field of Classification Search
CPC ..... C01B 17/00; C01B 17/02; C01B 17/0216; C01B 17/0226; C01B 17/0237; C01B 17/0243; C01B 17/0248; C01B 17/10; C01B 17/12
See application file for complete search history.

(56) References Cited

U.S. PATENT DOCUMENTS

| | | | | |
|---|---|---|---|---|
| 2,419,309 | A * | 4/1947 | Belchetz | C01B 17/10 23/294 R |
| 5,290,321 | A * | 3/1994 | Koga | C01B 17/12 23/293 S |
| 8,431,106 | B2 * | 4/2013 | Abry | C01B 17/0237 423/567.1 |
| 2021/0032104 | A1 * | 2/2021 | Kay | C01B 17/10 |

* cited by examiner

*Primary Examiner* — Timothy C Vanoy
(74) *Attorney, Agent, or Firm* — Thomas | Horstemeyer, LLP

(57) ABSTRACT

A method for producing insoluble sulfur, including: heating a sulfur to 200-700° C., quenching it with water, aqueous solution and other solvents, drying and solidifying the resulting substance at 40-80° C. for 3-15 h, to obtain an insoluble sulfur crude product; crushing the crude product in water into particles with a particle size of 50-400 meshes, wherein the water temperature is not higher than 80° C.; pumping the slurry of water and crude product into the upper part of an extraction column, pumping solvent into the lower part thereof; making the water and solvent from the top of the column flow into a separation tank to separate water phase and solvent phase, heating and evaporating the solvent phase to recover solvent and obtain soluble sulfur; heating and evaporating the insoluble sulfur and solvent from the bottom of the column to recover solvent and obtain purified insoluble sulfur.

3 Claims, 1 Drawing Sheet

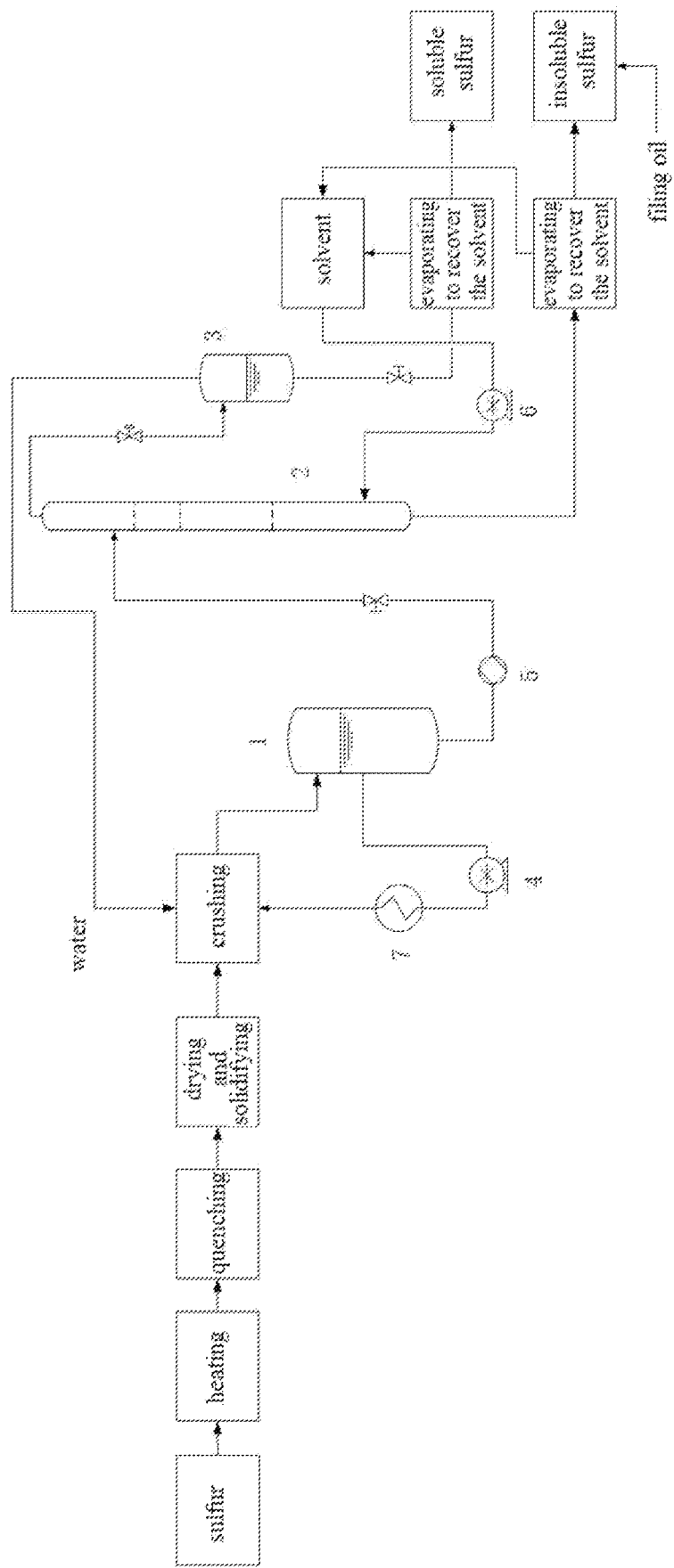

CONTINUOUS PROCESS FOR PRODUCING INSOLUBLE SULFUR

CROSS REFERENCE TO RELATED APPLICATION

This application claims the priority of Chinese Patent Application No. 201910739537.2, entitled "Continuous process for producing insoluble sulfur" filed with the China National Intellectual Property Administration on Aug. 12, 2019, which is incorporated herein by reference in its entirety.

TECHNICAL FIELD

The present disclosure relates to the field of non-metallic elements and the compounds thereof, and in particular to a continuous process for producing insoluble sulfur. The present disclosure belongs to CO1B 17/12 of International Patent Classification.

BACKGROUND

Insoluble sulfur (IS for short), also known as μ-type sulfur, is a long-chain polymerized sulfur formed by ring-opening polymerization of common sulfur, and is named because it is insoluble in carbon disulfide. Insoluble sulfur is mainly used as a vulcanizator of a rubber, and widely used in the production of radial tires. Insoluble sulfur has a high dispersibility and a high temperature stability, and thus can effectively avoid rubber blooming when being used in rubber mixing and has a good vulcanization effect. With the increasing demand for radial tires in China, the demand for insoluble sulfur is also increasing. The production of insoluble sulfur with common sulfur has high economic and social benefits.

So far, the main methods for producing insoluble sulfur comprise contacting method, high temperature evaporating method, melting method and so on. Among them, in the contacting method, hydrogen sulfide is mainly used as a raw material, and a catalytic oxidation reaction is performed on hydrogen sulfide in a reactor filled with an acid medium, to prepare insoluble sulfur, while in both of the high temperature evaporating method and melting method, a common sulfur is used as a raw material, and by using the ring-opening polymerization mechanism of sulfur induced by heating, an insoluble sulfur is prepared.

(1) Contacting Method

The contacting method is a method for producing insoluble sulfur by using $H_2S$ as a raw material, and depending on the catalytic oxidation of $NO_x+Fe^{3+}$. The detailed steps of the contacting method are as follows: introducing a high content of $H_2S$ gas (concentration>70%) and $O_2$ into an aqueous solution of strong oxidants $HNO_3$ and $FeCl_3$, so as to obtain insoluble sulfur under the action of redox. The reaction mechanism of preparing insoluble sulfur by the contacting method is as follows: under the action of strong oxidants $HNO_3$ and $Fe^{3+}$, $H_2S$ is partly oxidized to $SO_3^{2-}$ and reduction product NO; $SO_3^{2-}$ reacts with $H_2S$ to form insoluble sulfur, while the reduction product NO is oxidized to $NO_2$ by an introduced $O_2$, and the $NO_2$ subsequently reacts with $H_2S$ to form insoluble sulfur; $Fe^{3+}$ also reacts with $H_2S$ to form insoluble sulfur and $Fe^{2+}$, wherein $Fe^{2+}$ is then oxidized to $Fe^{3+}$ by $NO_2$, thereby realizing the recycling of $FeCl_3$ aqueous solution.

Compared with the conventional method for producing insoluble sulfur, the contacting method has an advantage of avoiding high temperature corrosion of a production equipment, and provides a new method for treating $H_2S$ waste gas for petrochemical and coal chemical enterprises. However, $H_2S$ is highly toxic, and has high requirements for the sealing of a production equipment; moreover, it is difficult to achieve large-scale production due to the restriction of the gas source; in addition, there are certain technical defects. In view of all this, the contacting method requires further exploration and research.

(2) High Temperature Evaporating Method

High temperature evaporating method comprises: mixing a common sulfur with an appropriate amount of stabilizer, then adding the resulting mixture into a reactor, then heating the mixture to 500-700° C., and spraying the obtained sulfur vapor into a cooling medium containing a stabilizer by using the pressure of the reactor itself at a very high speed for quenching, thereby obtaining a plastic sulfur. Since the polymerization reaction is a reversible reaction, after quenching, a part of polymeric sulfur would be transformed into soluble sulfur, so that the plastic sulfur product obtained is a mixture. The plastic sulfur is subsequently dried and solidified at a certain temperature, and then dry crushed. In order to obtain a high content of insoluble sulfur, the crushed product is usually extracted by a $CS_2$ solution, then filtered or centrifuged to remove the extractant carbon disulfide, and the remaining particles are dried to obtain the product.

(3) Melting Method

The melting method is most significantly different from the high temperature evaporating method in the difference in the state of sulfur at quenching. When being quenched, the sulfur is a steam in the high temperature evaporating method, while a liquid in the melting method. Thus, the quenching temperature of the melting method is not as high as that required by the high temperature evaporating method. The operating process for preparing insoluble sulfur by the melting method is as follows: heating a sulfur to 160-300° C., and then cooling the sulfur to ambient temperature quickly with water; separating the water, and drying and solidifying the resulting substance in air; subjecting the resulting solid to a series of operations, such as dry crushing, grinding and filtering, to obtain an insoluble sulfur crude products.

There are two types of insoluble sulfur so far. One is low-grade insoluble sulfur, i.e. an insoluble sulfur without leaching and purification, wherein the content of insoluble sulfur is only 50-60%. The other is high-grade insoluble sulfur, wherein the content of insoluble sulfur reaches above 90%. An extraction, also known as leaching, is generally used to purify insoluble sulfur in industry; that is, carbon disulfide is used to extract soluble sulfur from insoluble sulfur to obtain a high-grade insoluble sulfur.

In the process of using the insoluble sulfur, the sulfur powder would fly due to stirring and high temperature, which not only affects the production environment, but also has a risk of explosion. Therefore, in order to prevent the flying of the insoluble sulfur powder, an oil-filled insoluble sulfur is used in industry; that is, a mineral oil with a high flash point is filled into the insoluble sulfur powder to reduce the flying of dust.

Among the above methods for producing insoluble sulfur, the high temperature evaporating method is the most widely used, and there are two processes in the high temperature evaporating method. One is to use an aqueous solution as a quenching liquid, and the insoluble sulfur produced by this process has a high ash content due to the metal ion contained in the aqueous solution, which has adverse effects on the vulcanization and other properties of a rubber, and thus having a low price, but a high yield. The other is to use carbon disulfide as a quenching liquid, and the insoluble sulfur produced by this process has a low ash content and a good stability at high temperature, and thus having a high price, but a low yield. Since the sulfur obtained after quenching is a viscoelastic solid, which needs a long time to solidify before it can be crushed, leached and purified. Therefore, the production of insoluble sulfur in industry at present mostly adopts batch production methods, namely the steps of quenching, solidifying, crushing, leaching and purification, oil filling, etc. are carried out in different batch equipments. During sulfur crushing, dry crushing is adopted at present; that is, the dried sulfur is crushed in a crusher, and a large amount of dust is produced in the crushing process. Because sulfur is flammable and dust is explosive, the dry crushing method adopted at present is easy to cause fire and explosion, and almost all insoluble sulfur production enterprises at home and abroad have experienced fire and explosion caused by crushing, resulting in a loss of a large number of people and property, and posing a great risk to social security. Therefore, improving the method for crushing the insoluble sulfur to reduce the risks of explosion and fire are difficult problems faced by insoluble sulfur production enterprises. In addition, how to make the production process continuous is also a difficult problem for insoluble sulfur production enterprises at present. This disclosure will solve the two problems together.

SUMMARY

The present disclosure aims at providing a continuous method and process for producing insoluble sulfur to improve the safety of the producing process of insoluble sulfur, reduce the risks of fire and explosion, reduce the environmental pollution, reduce the labor intensity and improve the safety of the production process.

The method of the present disclosure, using an industrial sulfur as a raw material, comprises the following steps:

(1) heating the sulfur to 200-700° C., then quenching the sulfur with water, aqueous solution or other solvent as a quenching agent, and drying and solidifying the resulting insoluble sulfur at 40-80° C. for 3-15 h, to obtain a solid insoluble sulfur crude product containing 30-70% of insoluble sulfur;

(2) crushing the insoluble sulfur crude product obtained in step (1) in water in a pulverizer into particles with a particle size of 50-400 meshes, wherein the temperature of water is controlled to not higher than 80° C. during crushing;

(3) purifying and refining the insoluble sulfur obtained in step (2) in an extraction column, wherein water and the insoluble sulfur crude product are pumped into the upper part of the extraction column, and a solvent is pumped into the lower part of the extraction column;

(4) making the liquid flowing out from the top of the extraction column flow into a separation tank for water and solvent to obtain a water layer and a solvent layer, wherein the solvent layer is heated and evaporated to recover the solvent and sulfur, while the water layer returns to the pulverizer;

(5) feeding the insoluble sulfur and solvent separated from the lower part of the extraction column in step (3) into a filter to separate the solvent out;

(6) heating and evaporating the insoluble sulfur filtered in step (5) to recover the solvent; and (7) adding an appropriate amount of filling oil into the insoluble sulfur obtained in step (6), and uniformly mixing the resulting mixture to prepare an oil-filled insoluble sulfur.

Step (1) may be carried out by the existing processes for producing insoluble sulfur, including a high temperature evaporating method and a low-temperature melting method.

Among the above methods, the most important characteristic is that the solidified insoluble sulfur crude product is crushed in water. Compared with dry crushing, crushing in water has a good safety effect, and would not cause fire, explosion and other problems. At the same time, crushing in water can effectively control the crushing temperature, thereby preventing insoluble sulfur polymer from decomposing due to excessive temperature during the crushing process, which would reduce the yield of insoluble sulfur. In addition, using the method of crushing in water can also wash away excessive metal ions contained in the insoluble sulfur crude product produced by the high temperature evaporating method, reduce the ash content of the insoluble sulfur and improve the quality of the insoluble sulfur.

Another characteristic of the present disclosure is that the extraction solvents used are $CS_2$ and trichloroethylene. These two solvents are usually used alone, but they can also be used as a mixture. At present, $CS_2$ is more widely used. $CS_2$ has a strong solubility for sulfur and is easy to be recovered, but has a low spontaneous combustion temperature so that it may be easy to self-ignite. Trichloroethylene has a medium solubility for sulfur and is not easy to self-ignite, but it has a high boiling point and a high recovery temperature. Of course, other solvents can also be used as extraction solvents.

The water separated from the separation tank in step (4) can be returned to the crushing process in step (2) for reuse, which can reduce the water consumption. If the insoluble sulfur crude product is produced by a high temperature evaporating method, due to the presence of metal ions in the used quenching liquid, this part of water would contain metal ions, and it can be returned to the crushing process after separating these metal ions out.

According to the above method, another characteristic of the present disclosure is that after the insoluble sulfur crude product is crushed in water, the water and insoluble sulfur powder are pumped into the upper part of the extraction column. In this way, the sulfur aqueous slurry can be directly pumped into the extraction equipment by a pump without separating the crushed sulfur powder from water.

In the present disclosure, an extraction column is used as an extraction equipment. Of course, it is also possible to use other types of extraction equipments, such as extraction reaction kettle and extraction tank. The structure of the extraction column can be either an ordinary empty column or a plate column with inclined trays. After the slurry of sulfur and water enters the extraction column, due to the fact that sulfur (including insoluble sulfur) is immiscible with water, and the density of sulfur is larger than that of water, sulfur sinks into the extractant, and settles down the extraction column, and the soluble sulfur contained therein is continuously dissolved by the extractant. A solvent is pumped into the lower part of the extraction column, wherein the solvent may be $CS_2$ and trichloroethylene. Generally, these two solvents are used alone, but they can also be used as a mixture. At present, $CS_2$ is more widely used. The ratio of the solvent to the insoluble sulfur entering the extraction column needs to be adjusted according to the extraction effect. Generally, when $CS_2$ is used as the solvent, the ratio of $CS_2$ to the insoluble sulfur crude product is 6-10:1 (mass ratio), and when trichloroethylene is used as the solvent, the ratio is much higher, with the lowest being 15:1 (mass ratio). In order to improve the yield and stability of insoluble sulfur, a stabilizer could be added to the solvent, and the amount of stabilizer accounts for 1-10% of the solvent by weight. The stabilizer is one or more of styrene, α-methylstyrene, piperylene, oleic acid, linoleic acid, octadecene, tricresyl phosphate and dibutyl phosphite.

The extracted insoluble sulfur flowing out from the lower part of the extraction column is dried by heating and evaporating the solvent, wherein the temperature of the evaporating process for solvent is not higher than 80° C., otherwise the high-temperature stability of the insoluble sulfur will be reduced. Either an atmospheric distillation or a reduced pressure distillation can be used.

The dried insoluble sulfur is easy to cause dust flying in use, and thus it is necessary to add a part of filling oil to make oil-filled insoluble sulfur, wherein it is generally necessary to add 20-40% of filling oil. The insoluble sulfur and filling oil are mixed uniformly in a mixer. In order to improve the high temperature stability of insoluble sulfur, a stabilizer can be added into the filling oil, wherein the amount of the stabilizer accounts for 1-6% of the filling oil by weight.

According to the method provided by the present disclosure, the crushing process, which is easy to fire and explode, can be carried out in water, thereby significantly reducing the probabilities of fire and explosion. At the same time, since the crushing process is carried out in water, the temperature of crushing may be controlled by the amount and temperature of water, it is possible to prevent the influence of local high temperature generated in the crushing process on the high-temperature stability of insoluble sulfur; therefore, the high-temperature stability of the insoluble sulfur produced by this method is better than that of the insoluble sulfur produced by conventional method.

BRIEF DESCRIPTION OF THE DRAWINGS

FIGURE is a process flow chart for the present method. The following are the equipments and materials represented by the numbers in the chart.
1. Pump front buffer tank; 2. Extraction column; 3. Separation tank; 4. Pump; 5. Pump; 6. Pump; 7. Heat exchanger.

A sulfur is crushed in water after being heated, quenched, dried and solidified, and the crushed slurry then enters a pump front buffer tank 1, and circulated by a pump 4 to control the temperature of water not to exceed 80° C.; the sulfur aqueous slurry is pumped into the upper part of an extraction column 2 by a pump 5; a solvent is pumped into the lower part of the extraction column by a pump 6; the mixture of the water and solvent flowing out from the top of the extraction column enters a separation tank 3, and the water flowing out from the top of the separation tank 3 returns to the pulverizer; the solvent in the bottom of the separation tank 3 is evaporated to recover the solvent, and obtain an soluble sulfur; the insoluble sulfur and solvent flowing out from the bottom of the extraction column is evaporated to recover the solvent, and obtain an insoluble sulfur; after adding a filling oil, an oil-filled insoluble sulfur is obtained. A heat exchanger 7 can be used to reduce the heat generated in the crushing process and prevent the temperature of water from being too high.

THE EFFECT OF THE PRESENT DISCLOSURE

The production of insoluble sulfur according to the above method may realize continuously operating, thereby reducing the labor intensity of workers, and obtaining an insoluble sulfur with a stable quality and a good stability. The safety problems, such as explosion and fire caused by sulfur crushing in the production process, could be avoided, thereby eliminating the potential safety hazards.

DETAILED DESCRIPTION

The process of the present disclosure will be further explained with examples below.

EXAMPLE 1

According to the characteristics of the present disclosure, a small-scale experimental device as shown in the FIGURE was prepared in a laboratory. An insoluble sulfur crude product was prepared by a low-temperature melting method, wherein the content of insoluble sulfur was 35%, and the insoluble sulfur crude product was a strip with a length of 5-10 cm and a diameter of 1-2 mm. The strip-shaped insoluble sulfur crude product was crushed in water by a small pulverizer, and then filtered by a filter screen to obtain an aqueous slurry of insoluble sulfur crude product powder with a particle size of 100-400 meshes. The aqueous slurry of insoluble sulfur crude product powder was pumped into the entrance of the upper part of an extraction column, and $CS_2$ was pumped into the entrance of the lower part of the extraction column, wherein a stabilizer was added to $CS_2$. The mass ratio of the insoluble sulfur crude product to $CS_2$ was 1:8, the extraction column had a height of 3000 mm and a diameter of 80 mm, and the temperature thereof was controlled at 50° C. Water and $CS_2$ were separated from the top of the column and fed into a separation tank, and the separated water was reused, while the $CS_2$ layer was evaporated to recover $CS_2$ and obtain a soluble sulfur. An insoluble sulfur and a small amount of $CS_2$ were separated from the bottom of the column, and a purified insoluble sulfur with a purity of 94% was obtained after the solvent was evaporated. After adding a filling oil and a stabilizer, the stability of the insoluble sulfur reached 86% at 105° C. within 15 min, and 60% at 120° C. within 15 min, while the stability of oil-filled insoluble sulfur obtained by dry crushing and batch extraction was only 35% at 120° C. within 15 min. From this experimental device, it can be seen that the continuous extraction can be realized by using this method, and the insoluble sulfur product obtained has a better stability at high temperature (120° C.).

In the cases that $CS_2$ was replaced by trichlorothylene, and the ratio of the solvent to the insoluble sulfur crude product was set to 15:1, the quality of the insoluble sulfur obtained was almost the same as using $CS_2$.

EXAMPLE 2

According to the characteristics of the present disclosure, a small-scale experimental device as shown in the FIGURE was prepared in a laboratory. An insoluble sulfur crude product was prepared by a high temperature evaporating method, in which a sulfur was heated to 600° C., then quenched in an aqueous solution, and then dried and solidified to prepare an insoluble sulfur crude product, wherein the content of insoluble sulfur was 62%, and the insoluble sulfur crude product was a block with a length of 5-10 cm and a width of 1-2 mm. The block-shaped insoluble sulfur crude product was crushed in water by a small pulverizer, and then filtered by a filter screen to obtain an aqueous slurry of insoluble sulfur crude product powder with a particle size of 100-400 meshes. wherein the crushing temperature is controlled to not higher than 80° C. The aqueous slurry of insoluble sulfur crude product powder was pumped into the entrance of the upper part of an extraction column, and $CS_2$ was pumped into the entrance of the lower part of the extraction column, wherein the mass ratio of the insoluble sulfur crude product to $CS_2$ was 1:8, and the extraction column had a height of 3000 mm and a diameter of 80 mm, and the temperature thereof was controlled at 50° C. Water and $CS_2$ were separated from the top of the column; an insoluble sulfur and a small amount of $CS_2$ were separated from the bottom of the column, and a purified insoluble sulfur with a purity of 91% was obtained after the solvent was evaporated. After adding a filing oil and a stabilizer, the stability of the insoluble sulfur was 84% at 105° C. within 15 min, and was 49% at 120° C. within 15 min, while the stability of oil-filled insoluble sulfur obtained by dry crushing and batch extraction was only 33% at 120° C. within 15 min. From this experimental device, it can be seen that in addition to the elimination of the risks of dust, explosion and fire that generated during the crushing process, the continuous extraction can also be realized by using this method, and the insoluble sulfur product obtained has a better stability at high temperature (120° C.).

EXAMPLE 3

According to the characteristics of the present disclosure, a small-scale experimental device as shown in the FIGURE was prepared in a laboratory. An insoluble sulfur crude product was prepared by the high temperature evaporating method, in which sulfur was heated to 600° C., then quenched in $CS_2$, and then dried and solidified to prepare an insoluble sulfur crude product, wherein the content of insoluble sulfur was 41%, and the insoluble sulfur crude product was a block. The insoluble sulfur crude product was crushed in water by a small pulverizer, and then filtered by a filter screen to obtain an aqueous slurry of insoluble sulfur crude product powder with a particle size of 100-400 meshes, wherein the crushing temperature was controlled to not higher than 80° C. The aqueous slurry of insoluble sulfur crude product powder was pumped to the entrance of the upper part of an extraction column, and $CS_2$ was pumped to the entrance of the lower part of the extraction column, wherein the mass ratio of the insoluble sulfur crude product to $CS_2$ was 1:8, and the extraction column had a height of 3000 mm and a diameter of 80 mm, and the temperature thereof was controlled at 50° C. Water and $CS_2$ were separated from the top of the column; an insoluble sulfur and a small amount of $CS_2$ were separated from the bottom of the column, and a purified insoluble sulfur with a purity of 93% was obtained after the solvent was evaporated. After adding a filling oil and a stabilizer, the stability of the insoluble sulfur was 88.5% at 105° C. within 15 min, and was 62.5% at 120° C. within 15 min, while the stability of oil-filled insoluble sulfur obtained by dry crushing and batch extraction was only 45% at 120° C. within 15 min. From this experimental device, It can be seen that the continuous extraction can be realized by using this method, and the insoluble sulfur product obtained has a better stability at high temperature (120° C.).

From the above examples, it can be seen that by using the method of the present disclosure, it is possible to achieve the purposes of reducing fire hazards, realizing continuous production, reducing solvent volatilization and loss, and improving product stability. Of course, the above is only one embodiment of the present disclosure. It should be pointed out that those of ordinary skill in the art can make several improvements and modifications without departing from the principles of the present disclosure. These improvements and modifications fall within the protection scope of the claims of the present disclosure.

The invention claimed is:

1. A continuous method for producing insoluble sulfur, comprising the following steps:
   (1) heating a sulfur to 200-700° C., then quenching the sulfur with water, aqueous solution and other solvents as a quenching agent, and then drying and solidifying the resulting insoluble sulfur at 40-80° C. for 3-15 h, to obtain a solid insoluble sulfur crude product containing 30-70% of insoluble sulfur;
   (2) crushing the insoluble sulfur crude product obtained in step (1) in water in a pulverizer into particles with a particle size of 50-400 meshes, wherein a temperature of water is controlled to not higher than 80° C. during the crushing;
   (3) purifying and refining the insoluble sulfur obtained in step (2) in an extraction column, wherein water and the insoluble sulfur crude product are pumped into an upper part of the extraction column, and a solvent is pumped into the lower part of the extraction column;
   (4) making liquid flowing out from a top of the extraction column flow into a separation tank for water and solvent to separate a water layer and a solvent layer, wherein the solvent layer is heated and evaporated to recover the solvent and sulfur, while the water layer returns to the pulverizer;
   (5) feeding the insoluble sulfur and solvent separated from the lower part of the extraction column in step (3) into a filter to separate the solvent out;
   (6) heating and evaporating the insoluble sulfur filtered in step (5) to recover the solvent; and
   (7) adding a filling oil into the insoluble sulfur obtained in step (6) to result in a mixture, and uniformly mixing the resulting mixture to prepare an oil-filled insoluble sulfur product.

2. The continuous method as claimed in claim 1, wherein the solvent is $CS_2$.

3. The continuous method as claimed in claim 1, wherein the solvent is trichloroethylene.

* * * * *